United States Patent
Kadoya et al.

(10) Patent No.: US 10,514,486 B2
(45) Date of Patent: Dec. 24, 2019

(54) LIGHT EMITTING DEVICE THAT SUPPRESSES UNEVENNESS IN THE INTENSITY DISTRIBUTION OF THE LIGHT COMBINING ELEMENT

(71) Applicant: SHIMADZU CORPORATION, Kyoto-shi, Kyoto (JP)

(72) Inventors: Akiyuki Kadoya, Kyoto (JP); Ichiro Fukushi, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 0 days.

(21) Appl. No.: 16/324,022

(22) PCT Filed: Aug. 26, 2016

(86) PCT No.: PCT/JP2016/074913
§ 371 (c)(1),
(2) Date: Feb. 7, 2019

(87) PCT Pub. No.: WO2018/037548
PCT Pub. Date: Mar. 1, 2018

(65) Prior Publication Data
US 2019/0179071 A1  Jun. 13, 2019

(51) Int. Cl.
*F21V 8/00* (2006.01)
*G02B 27/09* (2006.01)

(52) U.S. Cl.
CPC ....... *G02B 6/0006* (2013.01); *G02B 27/0922* (2013.01)

(58) Field of Classification Search
CPC ..... G02B 6/0006; G02B 27/0922; G02B 6/42
See application file for complete search history.

(56) References Cited

U.S. PATENT DOCUMENTS

2012/0275150 A1* 11/2012 Yokotani .......... F21V 5/007
362/235
2014/0028985 A1  1/2014 Janssens
2014/0376220 A1* 12/2014 Shen ............... B29D 11/0074
362/235
(Continued)

FOREIGN PATENT DOCUMENTS

| JP | 3228098 | 5/1997 |
| JP | 2000-329962 | 11/2000 |

(Continued)

OTHER PUBLICATIONS

PCT/JP2016/074913, International Search Report and Written Opinion dated Nov. 29, 2016, 4 pages—English, 7 pages—Japanese.

*Primary Examiner* — Tracie Y Green
(74) *Attorney, Agent, or Firm* — Andrew F. Young, Esq.; Lackenbach Siegel, LLP

(57) ABSTRACT

The light emitting device is provided with a plurality of emitted elements 11, 12 to 1n; a light diffusion element 40 which diffuses emitted light L11, L12 to L1n respectively from the light emitting elements 11, 12 to 1n and outputs diffused light L21, L22 to L2n; and an optical coupling element 50 which receives the diffused light L21, L22 to L2n and outputs the output light L3 that is obtained by coupling the diffused light L21, L22 to L2n. The light diffusion element 40 diffuses the emitted light L11, L12 to L1n into a range that includes the direction of the optical axis of the optical coupling element 50.

6 Claims, 8 Drawing Sheets

(56) References Cited

U.S. PATENT DOCUMENTS

2016/0091784 A1    3/2016   Hu et al.

FOREIGN PATENT DOCUMENTS

| JP | 2008-96777 | 4/2008 |
| JP | 2013-92752 | 5/2013 |
| JP | 2013-167770 | 8/2013 |
| WO | WO 2013/088466 | 6/2013 |
| WO | WO 2015/145608 | 10/2015 |

* cited by examiner

LIGHT EMITTING DEVICE THAT SUPPRESSES UNEVENNESS IN THE INTENSITY DISTRIBUTION OF THE LIGHT COMBINING ELEMENT

CROSS REFERENCE TO RELATED APPLICATIONS

This application relates to, and claims priority from, Ser. No.: PCT/JP2016/074913 filed Aug. 26, 2016, the entire contents of which are incorporated herein by reference.

FIGURE SELECTED FOR PUBLICATION

FIG. 1

BACKGROUND OF THE INVENTION

Field of the Invention

The present invention relates to a light-emitting device that combines the lights emitted from a plurality of light-emitting elements and outputs a combined light.

Description of the Related Art

A laser combining module that combines the lights emitted from a plurality of light-emitting elements is available, wherein a semiconductor laser and a light-emitting diode (LED) are the light-emitting element therefor. A variety of technologies has been developed to increase an efficiency of the laser combining module. For example, the technology, in which the number of apertures (openings) of the optical fibers is limited, so that the laser light in the outer side of the collected (converged) laser lights are blocked (cut) to remove a high-order distortion (deformation), is disclosed (e.g., Patent Document 1).

With respect to the light-combing element such as an optical fiber, the output beam profile output from the light-combing element becomes uneven in the vertical plane to the light-axis direction due to the incident angle dependency. Specifically, when the emitted light out of the light-emitting element is incident with a certain angle relative to the light-axis direction of the light-combining element, the distribution of the output light provides a doughnut shape (torus form), i.e., the intensity thereof is low around the central region thereof and is high in the peripheral region thereof. And the area of the central region having a low-intensity is larger relative to the beam profile at the same cross-section along with increasing the incident angle of the emitted light.

Therefore, the method using the mode scrambler, is applied which stably distributes the light outputs of the light-combing element between the respective guided-modes to suppress unevenness of the intensity distribution taking place in the beam profile.

RELATED PRIOR ART DOCUMENTS

Patent Document

Patent Document 1: JP Patent 3228098 B1

ASPECTS AND SUMMARY OF THE INVENTION

Objects to be Solved

However, a heavy load on the light-combing element, such as bending largely the optical fiber, is needed to suppress the unevenness of the intensity distribution due to the incident angle dependency by the mode scrambler. Therefore, the light-combing element will likely break down. In addition, the other problems are that the laser combing module eats up a large space requirement and the production cost thereof increases.

Considering the above problem, a purpose of the present invention is to provide a light-emitting device that suppresses the unevenness of the intensity distribution taking place in the beam profile of the output light of the light-combining element.

Means for Solving the Problem

According to an aspect of the present invention, it is provided with a laser device comprising: a plurality of light-emitting element; a light-diffusing element that diffuses the respective emitted light out of a plurality of light-emitting elements and outputs the diffusion lights of every emitted light; and a light-combining element that receives the diffusion lights and outputs an output-light obtained by combining the diffusion lights of the plurality of the light-emitting elements; wherein the light-diffusion element diffuses the emitted lights in a range including the light-axis direction of the light-combining element.

Effects of the Present Invention

According to the aspect of the present invention, a light-emitting device that suppresses the unevenness of the intensity distribution taking place in the beam profile of the output light of the light-combining element.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
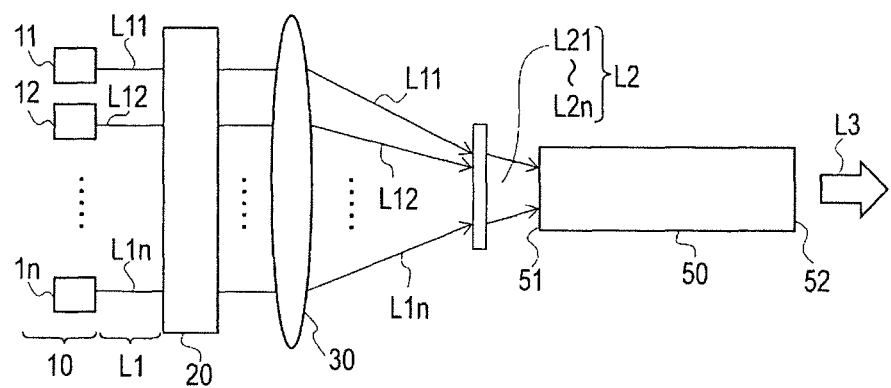
FIG. 1 is a schematic diagram illustrating the structure of a light-emitting device according to the aspect of the Embodiment 1 of the present invention.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Referring to FIGs., the inventors set forth the Embodiments of the present invention. Referring to FIGs., the same or similar element has the same or similar sign. However, it must be paid attention that FIGs. are schematic. In addition, hereinafter, the aspect of the Embodiment is an example to specify the technology aspect of the present invention and the structure and the arrangement of the components are not limited to the aspect of the Embodiment. The aspect of the Embodiment of the present invention can be modified in a variety of aspects within the scope of the present invention.

Embodiment 1

Referring to FIG. 1, the light-emitting device according to the aspect of the Embodiment 1 of the present invention comprises light-emitting elements 11, 12 to 1$n$ (n is an integer larger than 2), a collimating element 20, a converging element 30, a light-diffusing element 40 and a light-combing element 50.

The light-emitting elements 11, 12 to 1$n$ are such as semiconductor lasers and LEDs that respectively emits emitted lights L11, L12 to Ln (n is an integer larger than 2). The light-emitting elements 11, 12 to 1$n$ are the same light-emitting element or differs from each other relative to the wavelength of the emitted light and light output thereof.

The collimating element 20 collimates the respective emitted lights L11, L12 to L1$n$ from the light-emitting elements 11, 12 to 1$n$ and generates collimated lights thereof. The collimating element 20 is a group of collimator lens that are prepared for e.g., the emitted lights L11, L12 to L1$n$, respectively.

The collimating element 30 collimates the emitted lights L11, L12 to Ln from the light-emitting elements 11, 12 to 1$n$ and generates collimated lights thereof. Such as a converging lens is applicable to the converging element 30.

The light-diffusing element 40 diffuses the collimated light of the emitted lights L11, L12 to L1$n$ converged by the converging element 30 and outputs the diffusion light L21, L22 to L2$n$ every emitted lights L11, L12 to L1$n$. The light-diffusion element 40 is a light-diffusing plate made of e.g., quartz. The diffusion lights L21, L22 to L2$n$ are incident to the incident surface 51 of the light-combing element 50.

The output light L3 obtained by combining the diffusion lights L21, L22 to L2$n$ is output from the light-emitting surface 52 of the light-combing element 50 receiving the diffusion lights L21, L22 to L2$n$. The light-combing element 50 is a multi-mode fiber that guides such as the diffusion lights L21, L22 to L2$n$.

Hereinafter, the emitted lights L11, L12 to L1$n$ are collectively called the light-emitting element 10, the emitted lights L11, L12 to L1$n$ are collectively called the emitted light L1, and the diffusion lights L21, L22 to L2$n$ are collectively called the diffusion light L2.

Each incident angle of the emitted light L1 differs from each other depending on the location of the light-emitting element 10. Here, the incident angle is the angle between the traveling direction of the emitted light L1 incident to the light-diffusing element 40 and the extending direction of the light-axis (hereinafter, light-axis direction) of the light-combing element 50 relative to the incident surface 51. With respect to the light-emitting device referring to FIG. 1, the emitted light L1 incident to the light-diffusing element 40 with the different incident angle from one another respectively diffuses and the diffusion light L2 is output from the light-diffusing element 40. It is preferable that the emitted light L1 being combined by the light-combing element 50 is a collimated light. Therefore, when the collimated light is not emitted from the light-emitting element 10, it is preferred that the collimating element 20 generates the collimated light of the emitted light L1.

The diffusing element 40 outputs the diffusion light L2 diffusing including at least the light-axis direction relative to the respective emitted light L1. Hereinafter, the inventors set forth the function of the light-diffusing element 40. In addition, the range, in which the diffusion light L2 emitted from the light-diffusing element 40 diffuses, is called hereinafter a diffusion range. The diffusion range is set up by adjusting the light-diffusing element 40. In addition, relative to the diffusion angle of the diffusion light L2 in the diffusion range, the angle which is the maximum angle between the diffusion light and the light-axis is specified as the maximum diffusion angle $\theta d$. Specifically, the maximum diffusion angle $\theta d$ is the angle between the traveling direction of the outermost diffusion light L2 and the light-axis direction.

Figure 2:
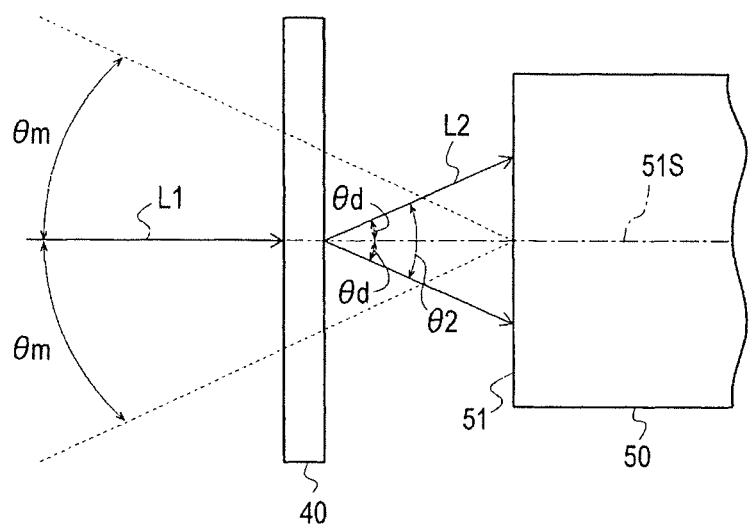
FIG. 2 is a schematic diagram illustrating the embodiment of the diffusing angle of the light-emitting device according to the aspect of the Embodiment 1 of the present invention.

For example, referring to FIG. 2, when the emitted light L1 is incident to the light-diffusion element 40 along the light-axis direction, the diffusion range of the diffusion light L2 diffusing with the diffusion angle $\theta 2$ from the light-diffusing element 40 is symmetrically broadening in the light-axis direction. For example, referring to FIG. 3, when the emitted light L1 is incident to the light-diffusion element 40 with the incident angle $\theta 1$, the diffusion range is symmetrically broadening in the extending direction of the incident direction. Accordingly, the maximum diffusion angle $\theta d$ is larger than the incident angle $\theta 1$.

When the emitted light L1 is incident to the light-combing element 50, the output beam profile of the output light L3 output from the light-combing element 50 appears as a doughnut-shape (torus) relative to the intensity distribution relative to the vertical surface to the light-axis direction (hereinafter, simply called intensity distribution) due to the incident angle dependency of the light-combing element 50. Referring to FIG. 1, when the emitted lights L1 from a plurality of light-emitting elements 10 are combined, the many incident emitted lights L1 have an incident angle, so that the intensity distribution tends to appear likely as a torus. Particularly, when the emitted lights L1 having a relatively large incident angle are many, the intensity difference in the intensity distribution is larger.

Whereas, with respect to the light-emitting device referring to FIG. 1, the diffusion light L2 originated from any emitted light L1 are output in the direction including the light-axis direction through the light-diffusing element 40. Therefore, whereas the intensity of the center region of the intensity distribution increases, the intensity of the peripheral region thereof decreases. Accordingly, the light-emitting device referring to FIG. 1 provides the output light L3 having the uniform (even) distribution of the intensity thereof. For example, the diffusion angle θ2 of the diffusion light L2 through the light-diffusion element 40 is set up so as to provide the even distribution of the intensity of the output light L3 while considering the distribution of the incident angle θ1.

On the other hand, according to the limitation of the number of the aperture (opening) (aperture number NA) of the light-combing element 50, the light among the diffusion lights L2, which has the larger angle than the maximum light-receiving angle of the light-combing element 50 and reaches to the incident surface 51 of the light-combing element 50, reflects from the incident surface 51. The relationship between the aperture number NA of the light-combing element 50 and the maximum light-receiving angle θm is given in the following formula (1).

$$NA=\sin(\theta m) \quad (1)$$

Figure 3:
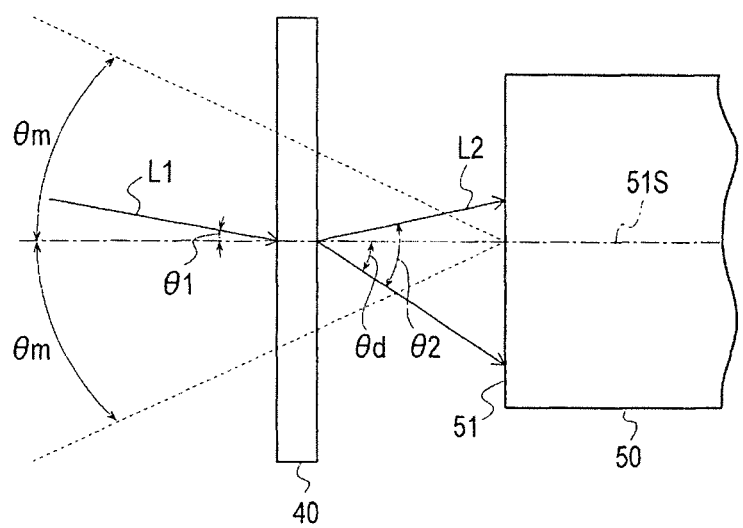
FIG. 3 is a schematic diagram illustrating another embodiment of a light-emitting device according to the aspect of the Embodiment 1 of the present invention.

Referring to FIG. 2 and FIG. 3, the range of angle, in which the emitted lights L1, which are combined by the light-combing element 50, can be incident to the incident surface 51, is twice as large as the maximum light-receiving angle θm as indicated by the broken lines in FIGs. The light component of which the angle between the diffusion light L2 and the light-axis is larger than the maximum light-receiving angle θm reflects at the incident surface 51 or fails to propagate in the core when the light-combing element 50 is a multi-mode fiber, so that such a light is unable to correctly propagate inside the light-combing element 50.

Accordingly, with respect to the emitted light L1 referring to FIG. 2, when the diffusion angle θ2 of the diffusion light L2 is smaller than twice as large as the maximum light-receiving angle θm, i.e., when the maximum diffusion angle θd is smaller than the maximum light-receiving angle θm, a whole of diffusion lights L2 is incident to the light-combing element 50. On the other hand, when the emitted light L1 diffuses so that the diffusion angle θ2 of the diffusion light L2 is larger than twice as large as the maximum light-receiving angle θm, the light component, of which diffusion angle θ2 is larger than the maximum light-receiving angle θm of the diffusion light L2, may not propagate correctly inside the light-combing element 50. Therefore, when the part of the emitted light L1, of which the incident angle θ is 0-degrees, is not combined by the light-combing element 50, the light-diffusing element 40 is adjusted to provide the formula θ2>2×θm.

On the other hand, with respect to the emitted light L1 referring to FIG. 3, when the maximum diffusion angle θd of the diffusion light L2 is smaller than the maximum light-receiving angle θm, the whole of diffusion lights L2 is incident to the light-combing element 50. On the other hand, when emitted light L1 diffuses so that the maximum diffusion angle θd of the diffusion light L2 is larger than the maximum light-receiving angle θm, the light component, a part of the diffusion light L2 is not combined through the light-combing element 50.

Accordingly, the ratio of the light-components combined through the light-combing element 50 is adjusted every emitted light L1 so that at least a part of the diffusion lights L2 meets the relational formula θd>sin⁻¹(NA), i.e., the diffusing element 40 diffuses the emitted light L1 so as to provide the formula θd>θm. The larger the maximum diffusion angle θd is than the maximum light-receiving angle θm, the higher the ratio of the light component cannot propagate correctly inside the light-combing element 50 of the light-diffusion light L2 increase. Therefore, as set forth below referring to Embodiment, the impact relative to the intensity distribution of the respectively output light L3 corresponding to a plurality of emitted lights L1 can be adjusted.

When combining the plurality of the emitted lights L1, the impact of the light output of the emitted light L1 having a large incident angle θ1 of the emitted light L1 relative to the intensity distribution is stronger due to the incident angle dependency. Particularly, the light output of the emitted light L1 providing a relatively large incident angle θ1 is larger than the light output of the emitted light L1 providing the smaller incident angle θ1, or when the number of the emitted light L1 providing a large incident angle θ1 is large, the intensity distribution appears as a torus in which the intensity in the peripheral region thereof is higher than the other parts. In such a way, the unevenness of the intensity distribution due to the distribution of the light output of the emitted lights L1 of the light-emitting element 10 takes place. In such a case, as set forth below, the unevenness of the intensity distribution is suppressible by adjusting the light-diffusing element 40 so that the maximum diffusion angle θd of the emitted light L1 providing the large incident angle θ1 is larger than the maximum light-receiving angle θm of the light-combing element 50.

The maximum diffusion angle θd of the emitted light L1 providing the larger incident angle θ1 is larger than the maximum diffusion angle θd of the incident angle θ1 providing the smaller incident angle θ1. As a result, the diffusion angle θ2 is set up so that the maximum diffusion angle θd is larger than the maximum light-receiving angle θm as for the emitted light L1 providing the relatively large incident angle θ1 and the maximum diffusion angle θd is smaller than the maximum light-receiving angle θm as for the emitted light L1 providing the relatively small incident angle θ1. Therefore, the part of the emitted light L1 providing the large incident angle θ1 is not combined through the light-combing element 50, so that unevenness of the intensity distribution is prevented.

In addition, when the emitted lights L1 having a different wavelength from each other combine, the wavelength component is adjustable based on setting the diffusion angle θ2. For example, the wavelength component relative to the output light L3 is adjustable by reducing the wavelength component of the emitted light L1 providing the large incident angle θ1.

Now, the diffusion light L2 is incident to the light-combing element 50 with the diffusion angle θ2 including the part over the limitation by the aperture number NA in accordance with adjusting the light-diffusing element 40 so as to provide the formula θd>θm. Accordingly, the output light L3 is output from the emission surface 52 of the light-combing element 50 while broadening at the same level as the maximum light-receiving angle θm. Specifically, the broadening of the output light L3 can be maximized.

However, when θd>θm is given, the light component traveling with diffusion angle θ2, which is larger than the maximum light-receiving angle θm of the diffusion light L2, cannot propagate correctly inside the light-combing element 50. Specifically, the whole of the emitted light L1 is not combined through the light-combing element 50 and as a result, the loss of the emitted light takes place. Therefore, when the broadening of the output light L3 is set above the efficiency, the formula θd>θm should be provided. However, whereas, when the incident angle θ1 of the emitted light L1 is 0-degrees, only one light-emitting element 10 is placeable; the larger incident angle θ1 relative to the light-emitting element 10 is, the higher number thereof can be increasingly placed. Therefore, the loss of the emitted light can be compensated by increasing the number thereof.

In addition, when the formula θd>θm is given only to the emitted light L1 providing the relatively large incident angle θ1, i.e., that the maximum diffusion angle θd is large, the loss of the emitted light can be reduced. In such a case, the balance (proportion) impacted by the emitted light L1 relative to the output light L3 is adjustable by adjusting the range of the incident angle θ1, in which the formula θd>θm is given.

For example, the diffusion angle θ2 is set up so as to meet the formula θd>θm with respect to the light-emitting element 10 providing the largest incident angle θ1. Therefore, for example, the diffusing element 40 diffuses the emitted light L1 so that the maximum diffusion angle θd relative to the light-emitting element 10 providing the largest incident angle θ1 is larger than the incident angle θ1 and the maximum diffusion angle θd relative to the other than such light-emitting element 10 is smaller than the incident angle θ1.

Specifically, with respect to the light-emitting device referring to FIG. 1, when the incident angle θ1 of the emitted light L11 from the light-emitting element 11 and the incident angle θ1 of the emitted light L1n from the light-emitting element 1n are the same, the emitted light L11 and the emitted light L1n diffuse so as to make the maximum diffusion angle θd larger than the maximum light-receiving angle θm. On the other hand, with respect to the light-emitting element 10 other than the light-emitting element 11 and the light-emitting element 1n, the emitted light L1 diffuses so as to make the maximum diffusion angle θd smaller than the maximum light-receiving angle θm.

In such a way, the loss due to the emitted light failing to correctly propagate inside the light-combing element 50 is limited to only a part of the emitted light L1 of the light-emitting element 10 providing the largest incident angle θ1. Accordingly, the loss of the emitted light is preventable as for the whole of the light-emitting device. In addition, many of the light-emitting element 10 providing the largest incident angle θ1 are placeable along around the light-axis direction. In such a way, the loss of the emitted light can be compensated.

In addition, with respect to the diffusion light L2 providing the largest maximum diffusion angle θd, the light-diffusing element 40 diffuses the emitted light L1 so as to meet the relational formula θd=sin$^{-1}$(NA), i.e., θd=θm, so that all of emitted lights L1 can be combined through the light-combing element 50. Specifically, the emitted light L1 diffuses so that the largest angle among the maximum diffusion angles θd of all diffusion lights L2 is the largest allowable incident angle to the light-combing element 50 in the relationship with the aperture number NA. Accordingly, the output light L3 is output from the emission surface 52 of the light-combing element 50 while the large broadening at the same level as the maximum light-receiving angle θm. In such a case, no loss of the emitted light without being combined takes place. For example, the diffusing element 40 diffuses the emitted light L1 providing the largest incident angle θ1 so as to meet the formula θd=θm.

As set forth above, at least the part of the emitted lights L1 diffuses at the diffusion angle θ2 that is the same angle as or the larger angle than the angle, by which the incidence is limited with the aperture number NA of the light-combing element 50, so that the output light L3 of which unevenness of intensity distribution is prevented is output from the light-combing element 50 while providing the largest broadening.

In addition, the light-diffusing element 40 may diffuse the emitted light L1 so as to meet the relationship of θd<sin$^{-1}$(NA), i.e., θd<θm as for all diffusion lights L2. In such a way, the diffusion light L2 is incident to the light-combing element 50 with the maximum diffusion angle θd allowing for the limitation due to the aperture number NA, so that all emitted lights L1 are combined through the light-combing element 50. For example, the part of the emitted lights L1 of the light-emitting element 10 places in the outside away from the light-axis correctly propagates ever inside the light-combing element 50 without the impact due to the fluctuation of the properties of the optical element. Accordingly, the broadening angle of the output light L3 is narrower than the maximum light-receiving angle θm, but the loss of the emitted light lowers.

As set forth above, with respect to the light-emitting device referring to FIG. 1, the light-diffusing element 40 enables arbitrarily setting the relationship between the maximum diffusion angle θd of the diffusion light L2 and the aperture number NA of the light-combing element 50. In such a way, the difference between the intensities relative to the intensity distribution due to a difference between the broadening angles of the output light L3 or between the light-outputs of the emitted lights L1 from a plurality of the light-emitting elements 10 is adjustable.

Figure 4:
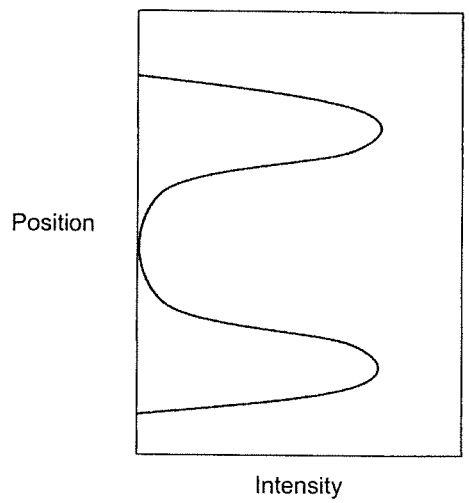
FIG. 4 is a graph illustrating the intensity distribution of output lights out of the light-emitting device according to the aspect of the comparative Embodiment.

Referring to FIG. 4, an example of the intensity distribution of the output lights L3 relative to the light-emitting device of the comparative embodiment is illustrated, wherein the emitted light L1 is directly incident to the light-combing element 50 without broadening by the light-diffusing element 40. Referring to FIG. 4, the horizontal axis denotes the intensity of the intensity distribution and the vertical axis denotes the position of the cross-section perpendicular to the traveling direction of the output light L3. Referring to FIG. 4, the intensity distribution of the output light L3 appears as a torus (doughnut shape) due to the incident angle dependency.

Whereas, in the cases of such as a laser therapy using multi-wavelength laser beam. a laser beam machining and a laser combine module combining with the multi-mode fibers for lighting, it is undesirable that the intensity distribution of the beam profile differs from each other depending on the incident angle. For example, with respect to such as a laser beam machining and the laser therapy, the high-power identical and multi-wavelengths laser beam is applied, so that it is undesirable that the intensity distribution is uneven when the light-emitting elements 10 emit independently or at the same time.

Figure 5:
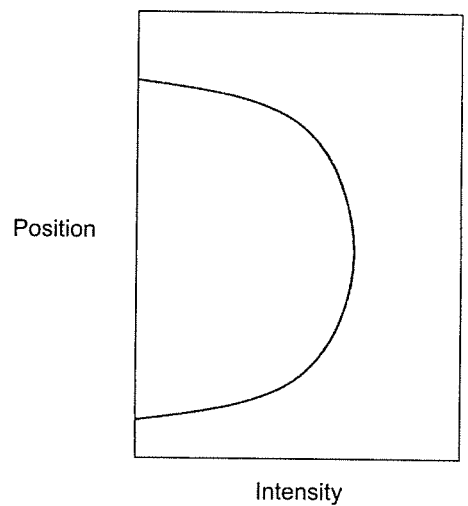
FIG. 5 is a graph illustrating the intensity distribution of a light-emitting device according to the aspect of the Embodiment 1 of the present invention.

Whereas, with respect to light-emitting device referring to FIG. 1, the light diffusion element 40 diffuses the emitted light L1 in the diffusion range including the light-axis direction of the light-combing element 50. Therefore, it is preventable that the intensity distribution as for the output light L3 from the light-combing element 50, to which the diffusion light L2 is incident, appears as the torus. Referring to FIG. 5, the example of the intensity distribution of the output light L3 relative to the light-emitting device referring to FIG. 1 is illustrated.

In addition, the diffusion light L2 diffuses, so that it is preferable that the distance between the light-diffusing element 40 and the light-combing element 50 is as short as possible to keep the high-combining efficiency. The light-diffusing element 40 and the light-combing element 50 are placed as close as possible, so that the space is further savable, and the production cost is more cuttable (reducible) compared to the case using a mode scrambler. For example, when the distance between the light-diffusing element 40 and the incident surface 51 is made shorter than 0.1 mm, the combining (coupling) efficiency can be kept in a high-level.

As set forth above, with respect to the light-emitting device according to the aspect of the Embodiment 1 of the present invention, the emitted light L1 from each of a plurality of the light-emitting elements 10 is diffused in the range including the light-axis direction of the light-combing element 50 followed by being incident to the light-combing element 50. As a result, with respect to the light-emitting device referring to FIG. 1, the incident angle dependency is restricted, so that the unevenness of the intensity distribution of the output light L3 output from the light-combing element 50 is preventable. Specifically, even when the emitted lights L1 of the plurality of light-emitting elements 10 placed at a variety of positions are combined through the light-combing element 50, the intensity distribution is prevented to provide the torus form.

In addition, the beam profiles are improved using the relatively small-size optical element such as the light-diffusing element 40. Therefore, the size of the light-emitting device is prevented from increasing compared to the case in which the mode scrambler is applied and as a result, the space thereof is savable. Further, with regard to the material cost and the production step, the cost-cut therefor is brought into reality.

In addition, a plurality of light-emitting elements 10 emitting the emitted lights L1, of which wavelength differs from each other, can be used in combination. Accordingly, the output light L3 can be multicolored.

Embodiment 2

Figure 6:
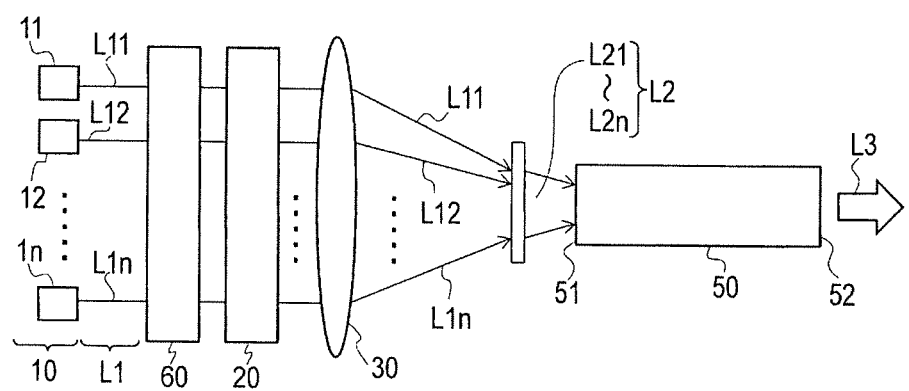
FIG. 6 is a schematic diagram illustrating the structure of a light-emitting device according to the aspect of the Embodiment 2 of the present invention.

Referring to FIG. 6, the light-emitting device according to the Embodiment 2 of the present invention further comprises a beam-width changing element 60 that changes the beam-width of the emitted light L1. In addition, the plurality of light-emitting elements 10 is arrayed in one dimension along the fast-axis of each emitted light L1. With respect to the light-emitting device referring to FIG. 6, the light-diffusing element 40 diffuses the emitted light L1, of which beam-width is changed by the beam-width changing element 60, to provide the maximum diffusion angle allowable for an incidence in the slow-axis direction in the relationship with the aperture number NA of the light-combing element 50.

Figure 7:
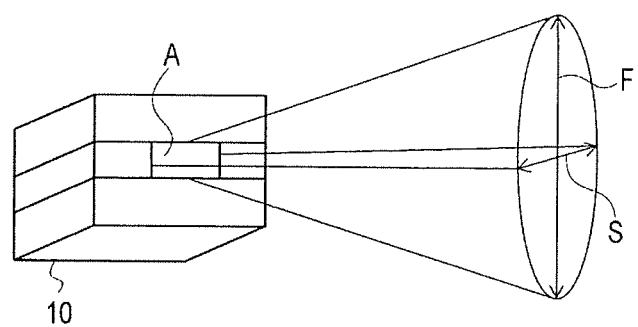
FIG. 7 is a schematic diagram illustrating the beam with of the light-emitting device.

When such as a semiconductor laser or a solid laser is applied to the light-emitting element 10, the beam-shape of the perpendicular cross-section to the traveling direction of the emitted light L1 (hereinafter, called traveling surface) is an ellipse (oval shape). For example, with regard to the emitted light L1 from the edge-emitting type single emitter semiconductor laser, the beam-width thereof is wider (broader) in the direction in which the emission area size (emitter size) is smaller. Specifically, referring to FIG. 7, the broader-size direction of the emission area A is a slow-axis direction and the narrower-size direction of the emission area A is the fast-axis direction. Referring to FIG. 7, with respect to the shape of the traveling surface of the emitted light L1, the beam-width is narrower in the broader direction (slow-axis direction S) of the emission area size and the beam-width is broader in the narrower direction (fast-axis direction F) of the emission area size.

Figure 8:
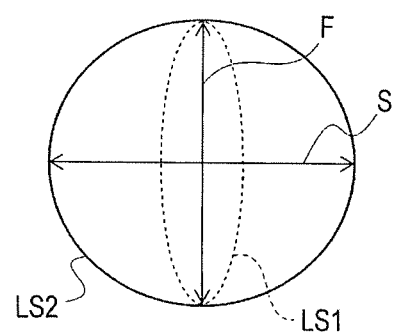
FIG. 8 is a schematic diagram illustrating the change of a beam width with the light-emitting device according to the aspect of the Embodiment 2 of the present invention.

The light-emitting device referring to FIG. 6 broadens each beam-width of the emitted lights L1 from the light-emitting elements 10, which are one-dimensionally arrayed along the fast-axis direction F, i.e., the shape LS1 indicated by the broken line in FIG. 8, to provide the shape LS2 indicated by the solid line. Specifically, the emitted lights L1 expanded in the slow-axis direction S are incident to the light-diffusing element 40 while being layered in the fast-axis direction F.

For example, the beam-width changing element 60 changes the beam-width of the emitted lights L1 in the slow-axis direction S so that the diffusion light L2 diffuses to provide the maximum width by the limit of the aperture number NA as broad as possible while allowing for correctly propagating inside the light-combing element 50. Specifically, the light-diffusing element 40 diffuses the emitted light L1, of which beam-width is changed, so that the diffusion angle $\theta 2$ in the slow-axis direction S is twice as large as the maximum light-receiving angle $\theta m$ of the light-combing element 50. In such a way, not only the broadening angle of the output light L3 broaden to the maximum extent, but also the loss of the emitted lights L1 not combined through the light-combing element 50 is minimal.

Therefore, it is preferable that the changing-width of the beam-width is adjustable every emitted light L1. For example, when the light-receiving surface of the converging element 30 is circular, the changing-width of the emitted light L1, of which incident angle $\theta 1$ is 0-degrees, is set as maximum, and the larger the incident angle $\theta 1$ is, the narrower the changing-width is. In such a way, the percentage of the light-component unreceived by the converging element 30 of the emitted light L1 lowers and as a result, the loss of the emitted light L1 is preventable.

Accordingly, when diffusing the emitted light L1 so as to meet the formula $\theta d = \theta m$, the light-emitting device referring to FIG. 6 is adequately applicable. However, a plurality of light-emitting elements 10 are placeable except the light-emitting element 10 of which the incident angle $\theta 1$ of the emitted light L1 is 0-degrees. Therefore, the loss of the emitted light due to the large incident angle $\theta 1$ can be compensated by adjusting the number of the light-emitting elements 10.

Such as a cylindrical lens is adequately applied to the beam-width changing element 60 to change the beam-width of the emitted light L1. In addition, such as a diffraction grating, a prism and so forth are applicable to change the beam-width.

As set forth above, with respect to the light-emitting device according to the aspect of the Embodiment 2, the diffusion light L2 is incident to the light-combing element 50 to the maximum extent limited by the aperture number NA in the slow-axis direction S. Therefore, the intensity distribution of the output light L3 is provided while the incident angle dependency is suppressed. The other aspects are the same as the Embodiment 1 and the duplicate description is skipped.

Other Embodiments

As set forth above, the present invention is described according to the aspect of the Embodiments, but it should not be understood that any parts, description and FIGs, of the present disclosure may limit the present invention. According to the present disclosure, a person skilled in the art can realize that a variety of the alternative Embodiment and applicable technology are clear.

As set forth above, the Embodiment in which the collimating element 20 is applied to collimate the emitted light L1 is illustrated. Whereas, when the light-emitting element 10 emits the collimated light, the collimating element 20 is inessential. In addition, when the emitted light L1 travels from the light-emitting element 10 toward the light-diffusing element 40, the converging element 30 may not be used.

Needless to say, the present invention may include a variety of Embodiments that are not described here. Accordingly, the scope of the technology of the present invention is specified by the invention specific matter in association with the claims of the present invention.

INDUSTRIAL APPLICABILITY

The light-emitting device of the present invention is applicable to the application in which that the emitted lights emitted from a plurality of light-emitting elements are combined and output.

Also, the inventors intend that only those claims which use the words "means for" (used in a required combination of 'means+for') are intended to be interpreted under 35 USC 112(f)/sixth paragraph. Moreover, no limitations from the specification are intended to be read into any claims, unless those limitations are expressly included in the claims.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A light-emitting device, comprising:
   a plurality of light-emitting elements;
   a light-diffusing element that diffuses an emitted light out of each of said plurality of light-emitting elements and outputs diffusion lights of every said emitted light; and
   a light-combining element that receives said diffusion light and outputs an output light-combining said diffusion lights of said plurality of light-emitting elements;
   wherein said light-diffusion element diffuses said emitted light in a range including a light-axis direction of said light-combining element; and
   said light-diffusing element diffuses said emitted light so that at least a part of said diffusion light meets the following relational formula, $\theta d > \sin^{-1}(NA)$;

wherein, $\theta d$ is a maximum diffusion angle that is a maximum angle between a traveling direction of an outermost edge of said diffusion angle and said light-axis direction and NA is an aperture number of said light-combining element.

2. The light-emitting device, according to claim 1, further comprising:
   a beam-width changing element that changes a beam-width of said emitted light;
   wherein said plurality of light-emitting elements are arrayed in one-dimension along a fast-axis direction of said emitted light, and said light-diffusing element diffuses said emitted light, of which beam-width is changed by said beam-width changing element, to a maximum angle allowable for an incidence in a slow-axis direction in accordance with a relationship with an aperture number of said light-combing element.

3. The light-emitting device, according to claim 1, wherein:
   said light-diffusing element diffuses said emitted light so that with respect to said light-emitting element providing a largest incident angle of said emitted light among said plurality of light-emitting elements, said maximum diffusion angle, which is said maximum angle between said traveling direction of said outermost edge of said diffusion light and said light-axis direction, is larger than said incident angle, and with respect to said light-emitting element other than said light-emitting element providing said largest incident angle of said emitted light, said maximum diffusion angle is smaller than said incident angle.

4. The light-emitting device, according to claim 1, wherein:
   a distance between said light-diffusing element and an incident surface of said light-combing element is at most 0.1 mm.

5. The light-emitting device, according to claim 1, wherein:
   said light-combing element is a multi-mode fiber.

6. The light-emitting device, according to claim 1, further comprising:
   a collimating element that generates a collimated light for each of said emitted lights from said plurality of light-emitting elements; and
   wherein said collimated light is incident to said light-combing element.

* * * * *